United States Patent [19]
Andres

[11] Patent Number: 5,553,427
[45] Date of Patent: Sep. 10, 1996

[54] PLASTIC EXTRUSIONS FOR USE IN FLOOR ASSEMBLIES

[75] Inventor: Thomas Andres, North Versailles, Pa.

[73] Assignee: Thermal Industries, Inc., Pittsburgh, Pa.

[21] Appl. No.: 397,002

[22] Filed: Mar. 1, 1995

[51] Int. Cl.⁶ ............................................. E04F 15/22
[52] U.S. Cl. ............................. 52/177; 14/73; 52/403.1; 52/480; 52/483.1; 52/650.3; 403/381; 405/219; D25/125; 114/266
[58] Field of Search ........................... 52/177, 180, 181, 52/403.1, 480, 650.3, 665, 578, 588.1, 483.1, 506.06, 506.01, 475.1; 114/263, 266; 403/381; 405/219; D25/125; 14/73

[56] References Cited

U.S. PATENT DOCUMENTS

| | | | |
|---|---|---|---|
| 3,620,027 | 11/1971 | Nordell | 405/219 |
| 3,815,550 | 6/1974 | Becker . | |
| 3,914,913 | 10/1975 | Roberts | 52/475.1 |
| 3,959,830 | 6/1976 | van den Broek . | |
| 4,058,942 | 11/1977 | Naka | 52/181 X |
| 4,078,515 | 3/1978 | Svirklys . | |
| 4,135,339 | 1/1979 | Pawlitschek . | |
| 4,266,381 | 5/1981 | Deller . | |
| 4,436,274 | 3/1984 | Kramer | 52/403.1 X |
| 4,840,824 | 6/1989 | Davis . | |
| 4,905,431 | 3/1990 | Davis | 52/181 X |
| 4,907,387 | 3/1990 | Turnbull | 52/177 |
| 4,947,595 | 8/1990 | Douds et al. | 52/177 |
| 4,964,618 | 10/1990 | Kennedy et al. | 52/483.1 X |
| 5,009,045 | 4/1991 | Yoder . | |
| 5,048,448 | 9/1991 | Yoder . | |
| 5,070,664 | 12/1991 | Groh et al. | 52/177 |
| 5,103,614 | 4/1992 | Kawaguchi et al. | 52/403.1 X |

*Primary Examiner*—Wynn E. Wood
*Assistant Examiner*—Kevin D. Wilkens
*Attorney, Agent, or Firm*—David V. Radack; Eckert Seamans Cherin & Mellott

[57] ABSTRACT

An extrusion for use in a floor assembly that is secured to a rigid underlying support. The extrusion has an exposed surface and a base section underlying the exposed surface. The extrusion is made of a first extruded material, preferably a hard polyvinyl chloride (PVC) and more preferably a co-extrusion of a recycled polyvinyl chloride substrate covered by a weatherable polyvinyl chloride capstock. The base section has at least a portion thereof including a second extruded material which is interposed between the plastic extrusion and the rigid underlying support when the plastic extrusion is secured to the rigid underlying support. The second extruded material resists undesired squeaking sounds from occurring when weight bearing loads move on the floor assembly. A floor assembly adapted to be secured to an underlying rigid support and a complete floor assembly and rigid underlying support are also disclosed.

9 Claims, 6 Drawing Sheets

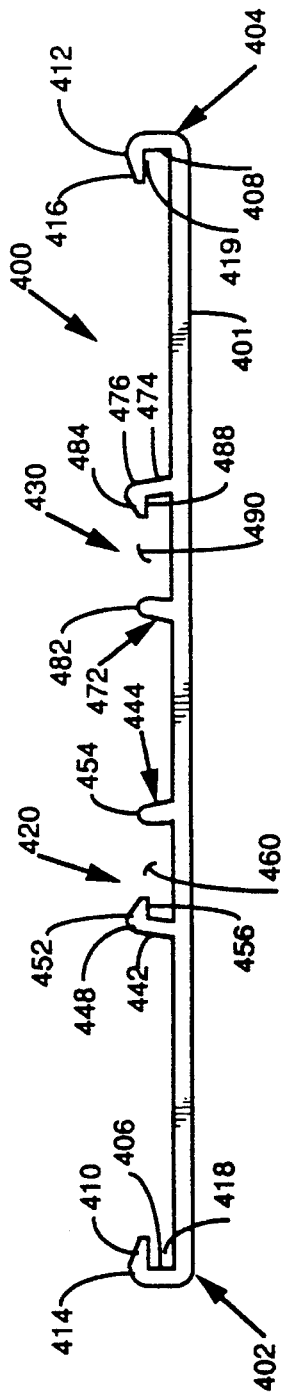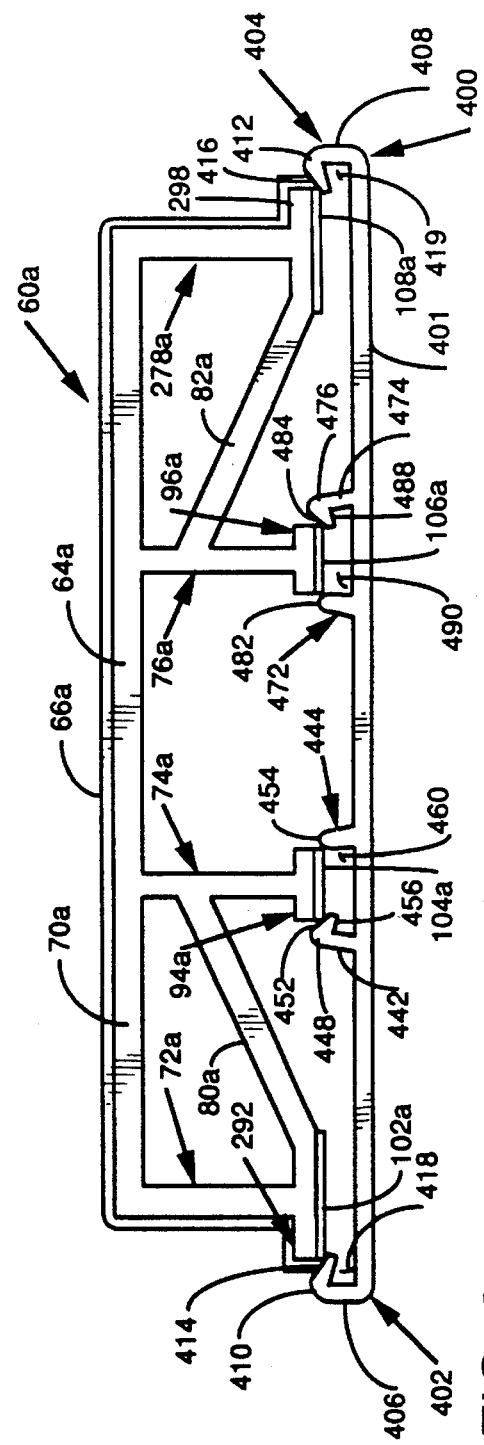

PLASTIC EXTRUSIONS FOR USE IN FLOOR ASSEMBLIES

BACKGROUND OF THE INVENTION

This invention relates to plastic extrusions for use in floor assemblies, and more particularly, to plastic extrusions which are connected to a rigid underlying support, such as wood joists, by an unique snap connector, the plastic extrusions including an additional extruded material interposed between the extrusion and the underlying support to resist undesired squeaking sounds from occurring when weight bearing loads move on the floor assembly.

It is very well known to construct floor assemblies, such as decks for homes and boat docks, using wood planks secured to an underlying support, such as spaced wood joists. There are, however, several disadvantages with using exposed wood planks for these applications. Wood, if left untreated, can very quickly rot, thus requiring replacement of some if not all of the wood planks. This occurs especially for wood decks and boat docks that are subject to outdoor weather conditions such as rain, snow and sunlight. In addition, wood planks can shrink, creating unsightly and dangerous gaps in the planking. Finally, wood is becoming more and more expensive.

Pressure treated lumber is widely used to protect the wood from rotting, however, even pressure treated lumber begins to rot over time with exposure to the elements. In addition, it is recommended by most vendors of pressure treated lumber that a protectant be applied to the wood. This protectant usually must be applied yearly. This is a major disadvantage of wood decks, due to the expense and time consuming nature of applying and reapplying this protectant year after year. Failure to be diligent in these applications can lead to early rotting of the exposed wood planks and the major expense and inconvenience of replacing some if not all of the wood planks.

It is known to use plastic extrusions for slatted floor assemblies. For example, U.S. Pat. No. 3,815,550 discloses a slatted floor assembly for animal enclosures and the like. The floor assembly consists of a set of elongated extruded plastic members, preferably made of polyvinyl chloride (PVC). A plurality of clip-like elements maintain the members in a spaced longitudinally parallel relationship. The elements are provided with a central, upright spacer and a pair of arms. Holding means in the form of notches which cooperate with projections are disposed at the outer ends of the arms in the spacer to releasably receive and exteriorly grip members.

U.S. Pat. No. 4,135,339 also discloses a slatted floor assembly useful for animal enclosures. The slats are made of polyvinyl chloride (PVC) and are snap fitted to a central member equipped with shoulders generally illustrated by reference nos. 140a and 142a of FIG. 4.

Despite the existence of these slatted floor assemblies, those skilled in the art still faced two nagging problems when attempting to use plastic extrusions for floor assemblies. The first problem was that when the plastic extrusions were secured to an underlying rigid support surface (such as a wood decking), an annoying and extremely undesirable squeaking sound is made when weight bearing loads were moved on the deck, such as when a person walks across the deck. The second problem was that there was no efficient and reliable method of attaching the plastic extrusions to the underlying rigid supports.

What is needed, therefore, is a plastic extrusion that eliminates the squeaking problem and a new connector for use in securing the plastic extrusion to the underlying rigid support.

SUMMARY OF THE INVENTION

The invention has met or surpassed the above mentioned needs as well as others. The extrusion for use in a floor assembly that is secured to a rigid underlying support comprises an exposed surface and a base section underlying the exposed surface. The extrusion is made of a first extruded material, preferably a hard polyvinyl chloride (PVC) and more preferably a co-extrusion of a recycled polyvinyl chloride (PVC) substrate covered by a weatherable polyvinyl chloride (PVC) capstock. The base section has at least a portion thereof including a second extruded material which is interposed between the plastic extrusion and the rigid underlying support when the plastic extrusion is secured to the rigid underlying support. The second extruded material resists undesired squeaking sounds from occurring when weight bearing loads move on the floor assembly.

The invention also includes a floor assembly adapted to be secured to an underlying rigid support, the floor assembly comprising a plurality of elongated plastic extrusions and a snap connector adapted to be attached to the underlying rigid support for securing the plastic extrusions to the rigid underlying support.

The invention also further includes a floor assembly comprising an underlying support and a plurality of elongated plastic extrusions secured to the underlying support. The plastic extrusions are constructed similarly to that described above.

BRIEF DESCRIPTION OF THE DRAWINGS

A full understanding of the invention can be gained from the following description of the preferred embodiment when read in conjunction with the accompanying drawings in which:

FIG. 8 is a cross-sectional view of another embodiment of a snap connector.

FIG. 9 is a cross-sectional view showing an extrusion as it is pressed down onto the snap connector of FIG. 8.

DETAILED DESCRIPTION

The plastic extrusions shown herein are used to form floor assemblies, such as an outdoor residential deck. It will be appreciated however, that there are numerous other uses for the plastic extrusions and/or snap connector disclosed herein including but not limited to boat docks, enclosure patios, dance floors or any flooring assembly where other materials, such as wood, are currently used. Therefore, although the description set forth herein focusses on a residential deck, it will be appreciated that the invention is not so limited and can encompass other flooring assemblies such as those mentioned above and more.

Figure 1:
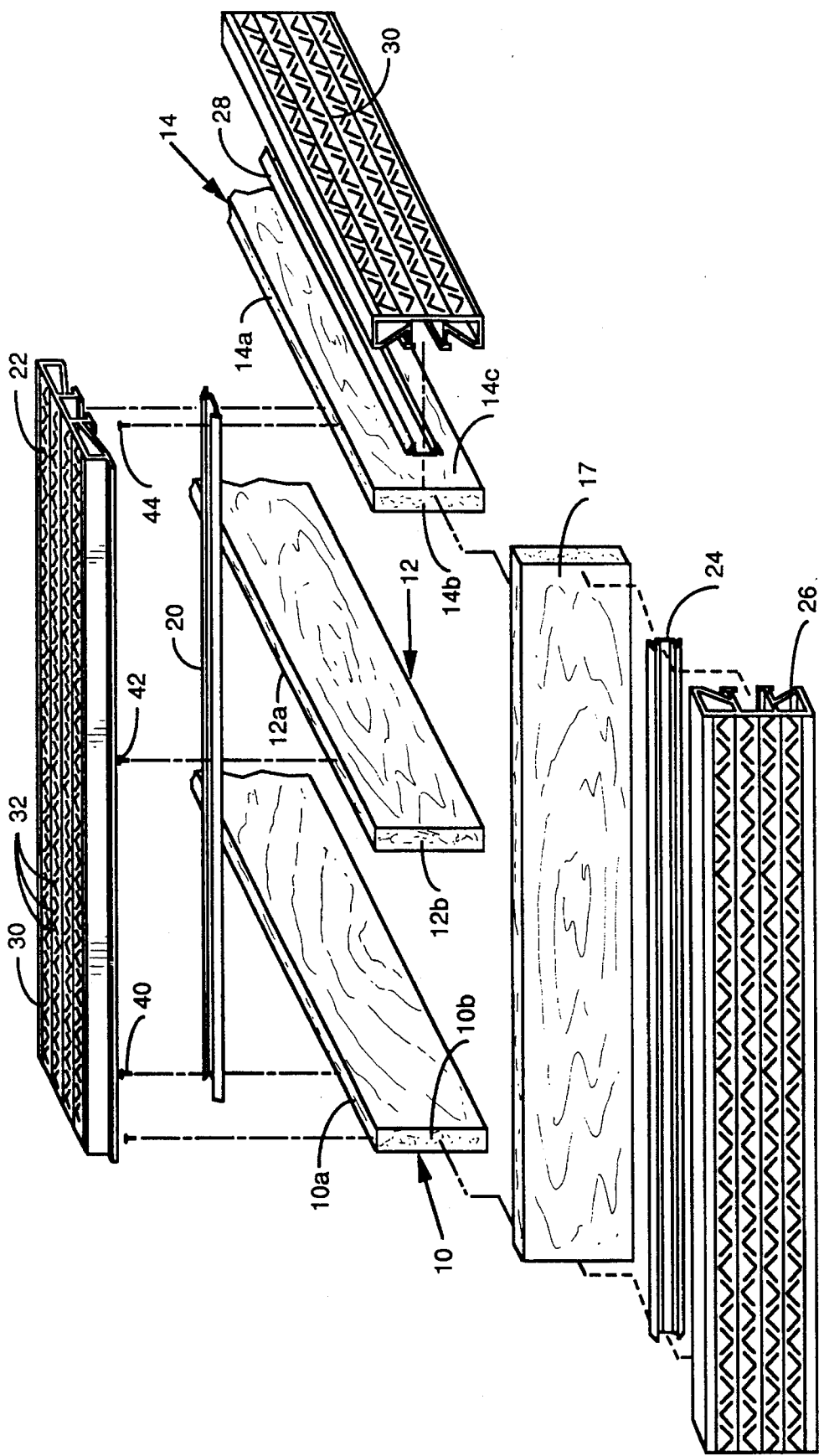
FIG. 1 is an exploded perspective view of the floor assembly of the invention.

Referring now to FIG. 1, an exploded perspective view of a floor assembly of the invention is shown. The floor assembly consists of a plurality of spaced parallel wood joists 10, 12, 14 which form the foundation of decking. The spaced parallel wood joists each have a horizontal surface 10a, 12a, 14a. These wood joists form a part of the underlying rigid support for the plastic extrusions (discussed below). A wood joist 17 is also mounted to narrow vertical sides 10b, 12b, 14b of each of the wood joists in order to complete the underlying rigid support for the floor assembly.

The floor assembly further consists of a snap connector 20 to which is connected a plastic flooring extrusion 22. It will be appreciated that a plurality of extrusions and snap connectors are mounted generally perpendicularly to the horizontal surface 10a, 12a, 14a of the wood joists in order to form the flooring assembly. FIG. 1 also shows a snap connector 24 and a plastic extrusion 26 that can be mounted to joist 17, which was initially secured on the narrow vertical sides 10b, 12b, 14b of wood joists 10, 12, 14. Yet another snap connector 28 and a plastic extrusion 30 can be mounted to wide vertical side 14c of wood joist 14 in order to complete the floor assembly.

As can be seen in FIG. 1, the plastic extrusions have an exposed surface 30 including a plurality of depressions 32 which make the floor slip-resistant.

Figure 2:
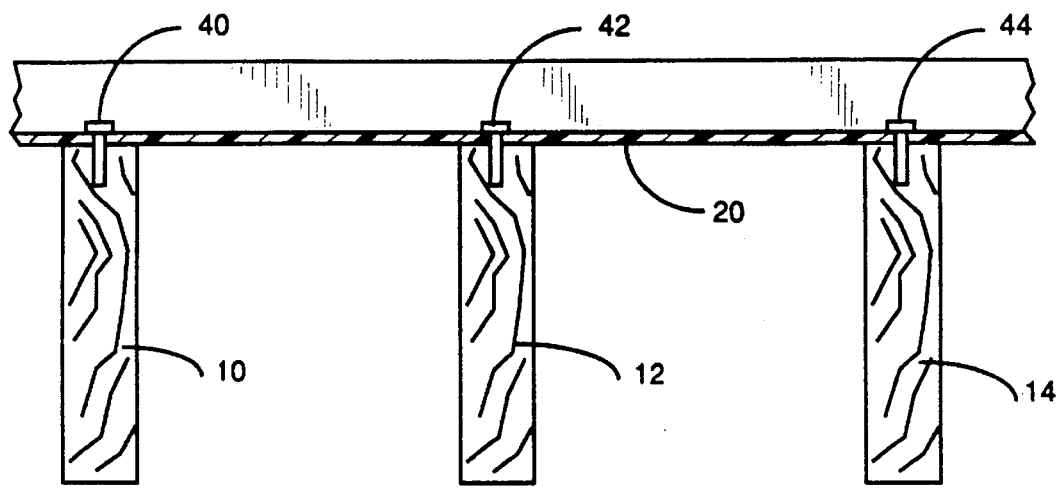
FIG. 2 is a cross-sectional view showing the snap connection of the invention as it is secured to the wood joists.

FIG. 2 shows snap connector 20 as it is mounted to wood joists 10, 12 and 14. Fasteners 40, 42 and 44 are used to secure the snap connector 20 to the respective wood joists. Fasteners 40, 42 and 44 are also shown in FIG. 1. It will be appreciated that similar fasteners (not shown) are used to secure snap connectors 24 and 28 to wood joist 17 and wood joist 14, respectively.

Figure 3:
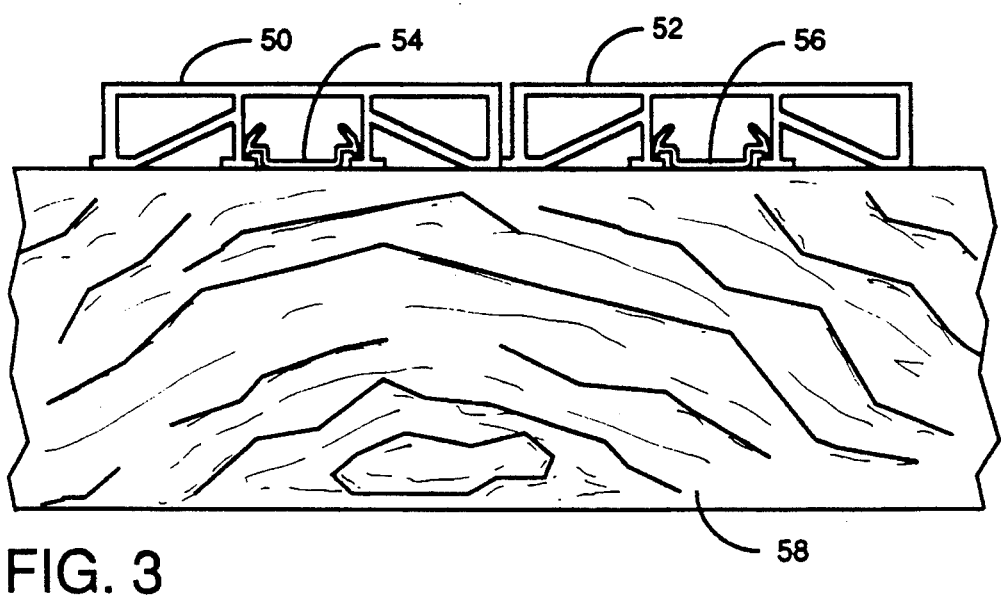
FIG. 3 is a cross-sectional view showing the profile of the extrusion and the snap connector.

Referring now to FIG. 3, a pair of extrusions 50 and 52 are shown being connected to respective snap connectors 54 and 56 to form the floor assembly. The snap connectors 54, 56 are secured to a wood joist 58 and then the plastic extrusions 50 and 52 are mounted onto their respective snap connectors 54 and 56.

Figure 4:
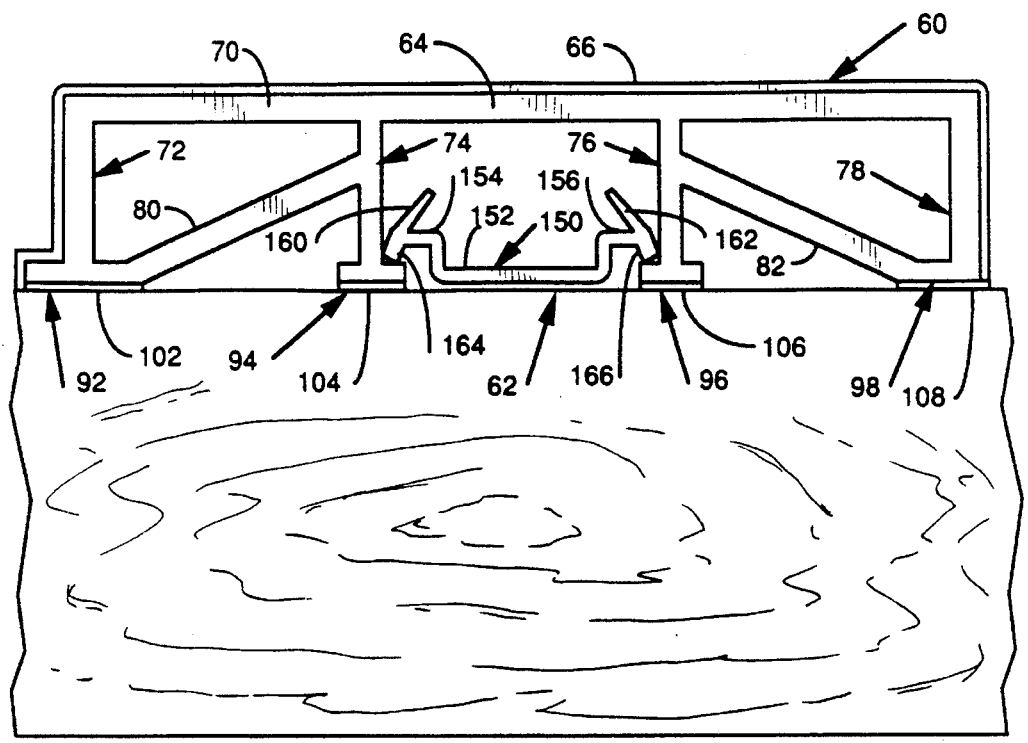
FIG. 4 is a detailed vertical cross-section of the plastic extrusion and the snap connector.

FIG. 4 shows a detailed view of a representative extrusion 60 which is connected to snap connector 62. The extrusion 60 consists of a substrate 64 made, preferably, of a recycled polyvinyl chloride (PVC) material, however, any extruded plastic material can be used. The substrate 64 is covered by a virgin capstock material 66 which is co-extruded onto the substrate by known methods. The virgin capstock material 66 is preferably a weatherable, hard, virgin polyvinyl chloride (PVC) material.

It will be appreciated that recycled polyvinyl chloride (PVC) can be used as the substrate because the substrate has all of its exposed surfaces covered by the virgin capstock material 66. Thus, the bulk of the extrusion can be made of less expensive, less attractive and readily available recycled polyvinyl chloride (PVC). Referring further to FIG. 4, the structure of the extrusion includes a load bearing horizontal portion 70 and four legs 72, 74, 76, 78 which extend generally perpendicularly to the load bearing horizontal portion 70. Legs 72 and 78 are the outer leg member and legs 74 and 76 are the inner legs members. Two angular cross-members 80, 82 are provided having ends connected to legs 72 and 74 and legs 76 and 78 respectively. It will further be seen that leg 72 has a foot section 92 that extends generally perpendicularly to leg 72 and which contacts the wood joist underlying support surface. Similarly, legs 74, 76, 78 each include foot sections 94, 96, 98.

As was explained in the Background section above, one of the major problems with plastic extrusions was that an annoying squeaking sound was made when load bearing objects, such as persons, moved across the floor. This problem is solved by providing a soft, polyvinyl chloride (PVC) layer 102, 104, 106, 108 which is applied to the bottom surface of each of the foot sections 92, 94, 96, 98. This polyvinyl chloride (PVC) layer has a softer durometer than the polyvinyl chloride (PVC) used for the capstock material 66 and the substrate 64. In this way, the soft layers 102, 104, 106, 108 act as a cushion between the wood joists (wood joist 120 is shown in FIG. 4) and the remainder of the plastic extrusion, so that there is not rigid structure-to-rigid structure contact therebetween. This, in turn, eliminates the annoying squeaking sound that heretofore has plagued attempts to successfully market and sell floor assemblies made with plastic extrusion.

Referring now to both FIGS. 4 and 5, the structure and operation of the snap connector 62 will be explained. The snap connector 62, which is also made of an extruded polyvinyl chloride (PVC), consists of an elongated base portion 150 having a middle section 152 and a pair of inverted "L" sections 154 and 156 extending from the opposite edges of the middle section. Attached to the "L" sections 154 and 156 are respective flanges 160 and 162 which are disposed in an angular relationship to the "L" sections 154 and 156. As can be seen in FIG. 4, the bottom sections 164 and 166 of flanges 154 and 156 are in intimate surface-to-surface contact, and indeed are "wedged in" the corner formed by leg 74 and foot section 94 (for bottom section 164) and leg 76 and foot section 96 (for bottom section 166). This arrangement resists both (i) upward and (ii) side-to-side relative movement of the plastic extrusion 60 to the snap connector 62.

Figure 5:
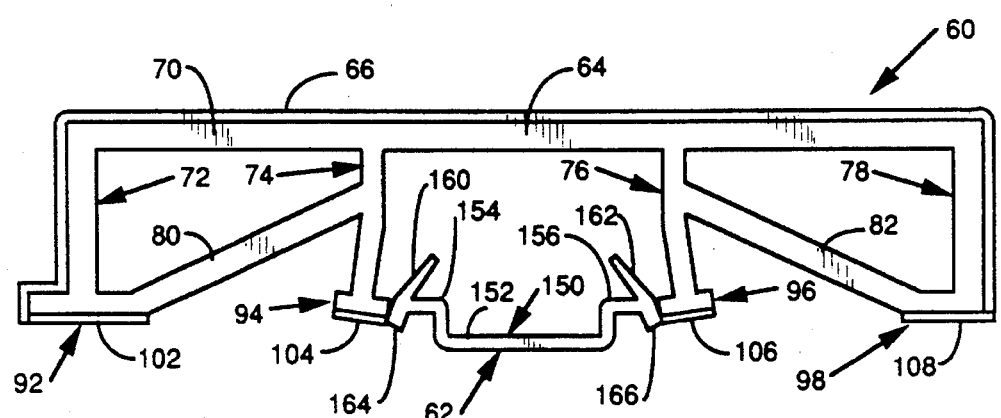
FIG. 5 is a view similar to FIG. 4 only showing the extrusion as it is pressed down onto the snap connector.

Referring now to FIG. 5, in order to connect the extrusion 60 to the snap connector 62, the extrusion 60 is merely pressed down on the snap connector 62, thus forcing the resilient legs 74 and 76 to bend outwardly. The bending of the legs 74 and 76 is facilitated by the angular orientation of flanges 160 and 162, which act as a pilot surface to bend the legs 74 and 76 outwardly. Once the legs 74 and 76 are pressed down far enough to clear the bottom sections 164 and 166 of the flanges 160 and 162, legs 74 and 76 along with foot sections 94 and 96, snap into the position shown in FIG. 4. The extrusion 60 is thus securely connected to the snap connector 62.

Figure 6:
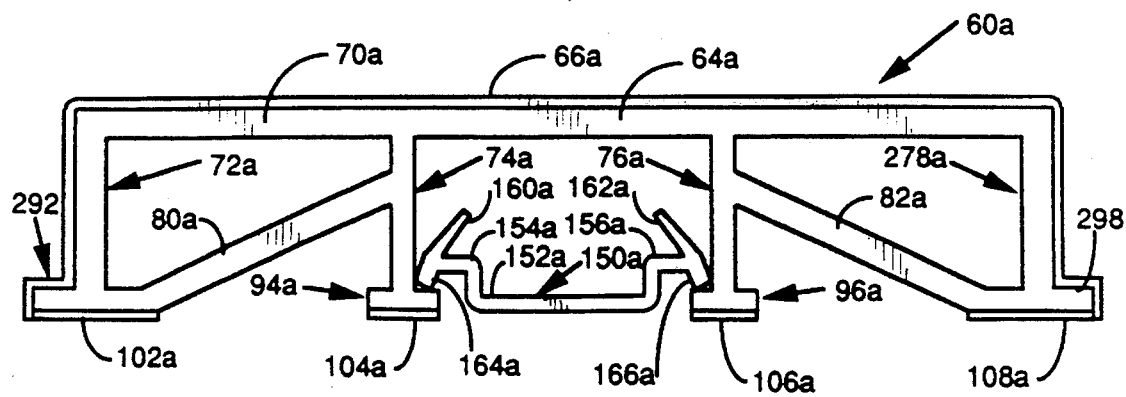
FIG. 6 is a cross-sectional view of another embodiment of a plastic extrusion having a different profile than the extrusion shown in FIGS. 1–5.
Figure 7:
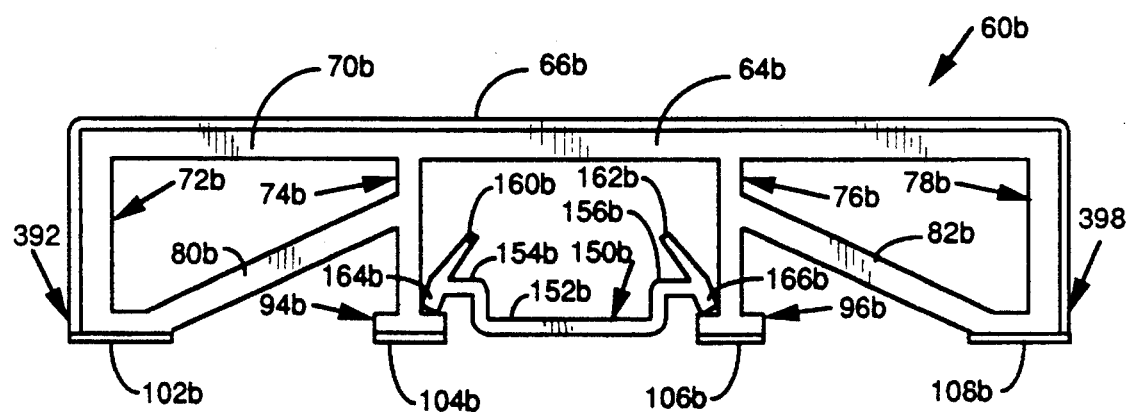
FIG. 7 is yet another extrusion having a still different profile.

FIGS. 6 and 7, in which similar reference numbers to FIGS. 4 and 5 are indicated by the suffix "a" (FIG. 6) and "b" (FIG. 7) show alternate profiles for the extrusion of the invention. In FIG. 6 foot sections 292 and 298 extend outwardly from their respective flange portions as opposed to FIGS. 4 and 5 where only foot section 92 extends outwardly and foot section 98 does not extend outwardly. In FIG. 7 neither foot sections 392 and 398 extend outwardly from their respective flange portions.

FIG. 8 shows an alternate embodiment of a snap connector 400 which can be mounted on the wide vertical side 14c of wood joist 14 and/or wood joist 17 (see FIG. 1) to facilitate securement of the vertically oriented plastic extrusions, such as plastic extrusions 26 and 30, to the floor assembly.

The snap connector 400, which is also made of an extruded polyvinyl chloride (PVC) material, includes an elongated base 401 having a pair of opposed elongated end flanges 402 and 404. Each flange 402, 404 includes a first section 406, 408 which extends generally perpendicularly to base 402 and a second section 410, 412 which in turn extends generally perpendicularly from first section 406, 408. Each second section 410, 412 includes a pilot surface 414, 416. The flanges 402, 404 each define a recessed space 418, 419. The snap connector also includes two locking members 420 and 430. Locking member 420 consists of a pair of flanges 442, 444 which extend at a slight inward angle from a line perpendicular to the base 402. Flange 442 includes an inwardly facing lip 448. Lip 448 has an upper pilot surface 452 and a lower surface 456 which is generally parallel to base 402. Flange 444, on the other hand, does not include a lip but does have an upper pilot surface 454. The flanges 442, 444 define a locking space 460.

Locking member 430 is similar to locking member 420, and consists of a pair of flanges 472, 474 which extend at a slight inward angle from a line perpendicular to the base 402. Flange 474 includes an inwardly facing lip 476. Lip 476 has an upper pilot surface 484 and a lower surface 488 which is generally parallel to base 402. Flange 472, on the other hand, does not include a lip, but does have an upper pilot surface 482. The flanges 472, 474 define a locking space 490.

Figure 10:
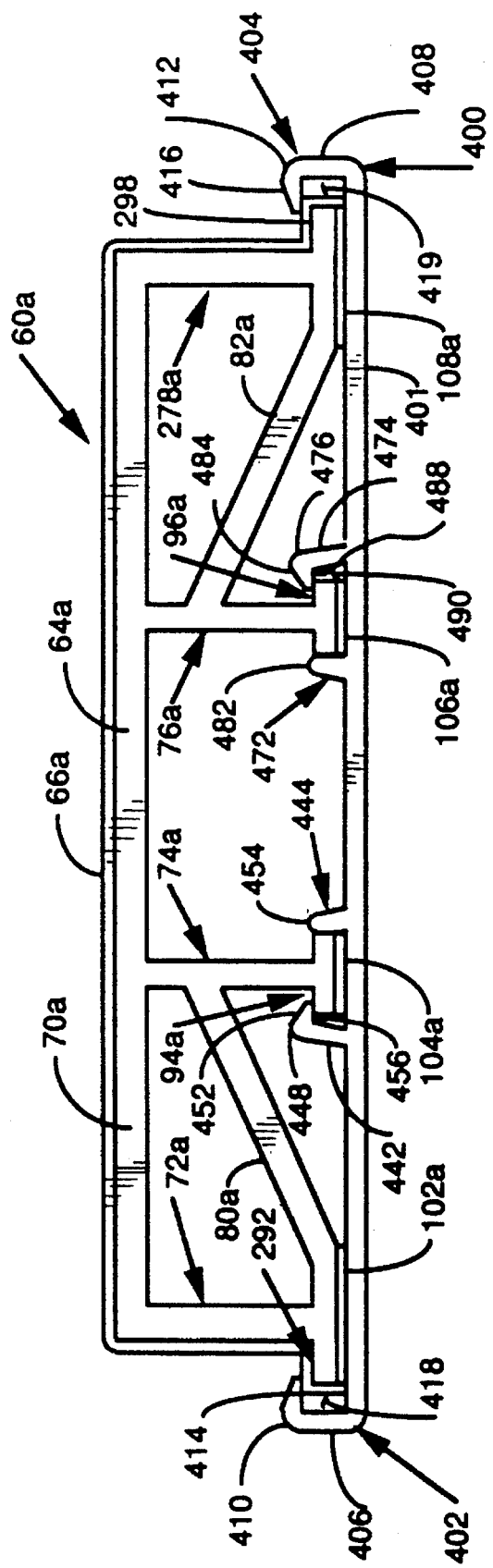
FIG. 10 is a cross-sectional view similar to FIG. 9 only showing the extrusion after it is snapped down onto the snap connector.

FIG. 9 shows how a plastic extrusion, in this case plastic extrusion 60a shown in FIG. 6, engages into snap connector 400. The extrusion 60a is merely pressed down on the snap connector 400. The legs 292, 94a, 96a and 298 engage against the respective pilot surface, i.e., pilot surface 414 for foot section 292; pilot surfaces 452, 454 for foot section 94a; pilot surfaces 482, 484 for foot section 96a; and pilot surface 416 for foot section 298. Once the legs 292, 94a, 96a and 298 are pressed down far enough to clear flanges 402, 442 and 444, 472 and 474, 404 respectively, the legs 292, 94a, 96a and 298 snap into recessed spaces 418, 460, 490 and 419, respectively as is shown in FIG. 10. The extrusion 60a is thus securely connected to the snap connector 400.

It will be appreciated that snap connector 400 is shown in use with the profile of FIG. 6. Snap connector 400 can be modified to be used with the profiles shown in FIGS. 5 and 7, also. With regard to the profile in FIG. 5, it will be appreciated that foot section 98 does not have a section that extends outwardly from leg 78, as does foot section 298 of FIG. 6. In this case, flange 404 of the snap connector 400 is not necessary. In the case of the profile shown in FIG. 7, both foot sections 392, 398 do not have a section that extends outwardly from legs 72b, 78b respectively. In this case both flanges 402 and 404 are not necessary.

It will be appreciated that a plastic extrusion for use in a floor assembly is provided which can be used as a replacement to wood and which solves the squeaking problem faced by those skilled in the art when using prior art plastic extrusions. In addition, the snap connector disclosed provides an efficient and effective apparatus for securely attaching the plastic extrusions to the underlying rigid support.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A floor assembly which is secured to a rigid underlying support, said floor assembly comprising:

a plurality of elongated extrusions, each said extrusion including a pair of outer leg members and a pair of inner leg members, each said inner leg member including a foot section having a portion thereof in substantial contact with said rigid underlying support;

a snap connector having an elongated base portion and a pair of flanges attached to opposed major sides of said base portion, said flanges extending outwardly from said base and defining, along with said rigid underlying support, a recessed space that receives said foot section; and said inner leg members are made of a resilient material and bend outwardly when said extrusion is pressed onto said snap connector and then snap inwardly to interlock with said snap connector in order to secure said extrusion to said snap connector and said rigid underlying support.

2. The assembly of claim 1, wherein said flanges form a pilot surface to facilitate snapping said extrusion onto said snap connector.

3. The assembly of claim 1, wherein each of said extrusions is made of a first extruded material and includes an exposed surface and a base section underlying said exposed surface, said base section having at least a portion thereof including a second extruded material which is interposed between said extrusion and said rigid underlying support when said extrusion is secured to said rigid underlying support, said second extruded material resisting undesired squeaking sounds from occurring when weight bearing loads move on said floor assembly.

4. The assembly of claim 3, wherein said exposed surface has a plurality of depressions defined therein to make said exposes surface slip-resistant.

5. The assembly of claim 3, wherein said first extruded material has a hardness greater than the hardness of said second extruded material.

6. The assembly of claim 5, wherein said second extruded material is polyvinyl chloride (PVC).

7. The assembly of claim 6, wherein said first extruded material is polyvinyl chloride (PVC).

8. The assembly of claim 7, wherein said plastic extrusion includes a capstock disposed over said exposed surface.

9. The assembly of claim 8, wherein said capstock is made of virgin weatherable polyvinyl chloride (PVC).

* * * * *